Jan. 22, 1963   JEROME N. C. CHI   3,075,106
DYNAMOELECTRIC MACHINE
Filed March 9, 1961

Inventor:
Jerome N.C.Chi,
by John M. Stoudt
His Attorney

United States Patent Office 3,075,106
Patented Jan. 22, 1963

3,075,106
DYNAMOELECTRIC MACHINE
Jerome N. C. Chi, Fort Wayne, Ind., assignor to General Electric Company, a corporation of New York
Filed Mar. 9, 1961, Ser. No. 94,480
6 Claims. (Cl. 310—60)

The present invention relates to dynamoelectric machines and more particularly is concerned with certain improvements in an arrangement for cooling electric motors suitable for use in hermetic refrigeration motor-compressor units.

In the construction of certain types of dynamoelectric machines, as for example, hermetically sealed refrigeration motor-compressor units, it is customary to divide the unit into communicating motor and compressor chambers and to mount a stator core and rotor in the motor chamber. The stator core includes winding slots for accommodating a main running winding disposed radially beyond an auxiliary winding used for starting purposes, both windings having end turns projecting axially beyond the sides of the stator core. Each winding is composed of turns of wire coated with enamel and electrically insulated from the core by slot insulation. A typical insulating system is shown by the patent to Hall et al., 2,169,097. In addition, the windings are also insulated one from the other by so-called phase insulation placed between the windings, including the portions of the windings which project beyond the sides of the stator core.

Since current passes through the windings and produces heat which has the general effect of increasing the resistance of the windings and the total temperature rise of the motor, a marked decrease in motor performance results if the heat is not efficiently and effectively dissipated from the motor. In the past, it has been common practice to form one end of the rotor with relatively small radial blades to direct the somewhat cool suction inlet refrigerant gas or fluid into contact with the adjacent winding end turns in an effort to transfer the generated heat away from the windings to the cooling fluid. This approach for cooling the motor has not been too satisfactory and the problem of adequate heat removal is greatly magnified in those situations where only the main winding is energized during running conditions and is located radially behind the unexcited auxiliary winding. Thus, the radial blades of the rotor direct the flow of cooling fluid primarily into contact with the end turns of the unexcited auxiliary winding and the heat from the energized main winding is not efficiently removed.

In an attempt to overcome this ineffectual cooling arrangement, and to insure the fact that the winding enamel, phase and slot insulators will not lose their mechanical and dielectrical strengths at elevated winding temperatures, e.g., above 103° C., in some applications a special grade or class of insulation was employed. This, of course, increased the over-all cost of manufacturing the motors but did not reduce the winding resistance or enhance the motor performance. However, regardless of the type of insulating material utilized, the total permissible temperature rise of the windings and of the motor is dictated by the temperature at which the refrigerant will break down and decompose; e.g. for certain gases in the neighborhood of 200° centigrade.

Thus, it can be seen that a satisfactory arrangement for cooling motors which are designed to operate primarily in hermetic refrigeration motor-compressor units, is a continuing problem in the motor industry.

Therefore, it is a principal object of the present invention to provide a dynamoelectric machine with an improved cooling arrangement for effectively removing the heat generated in the machine.

Another object of the machine is to provide an improved cooling arrangement for an electric motor which has the effect of minimizing the temperature rise of the surrounding motor enclosure and of the motor itself when the motor is operated in a motor-compressor unit.

It is a further object of the invention to provide an improved rotor having means particularly effective in dissipating the heat from winding end turns of a unidirectional motor suitable for use in a hermetically sealed refrigeration motor-compressor unit.

It is yet another object of the invention to provide a motor-compressor unit with an improved rotor construction which effectively transfers the heat from the main running winding during running conditions to a cooling refrigerant fluid even though the running winding is positioned radially behind an auxiliary winding thereby maintaining the temperature rise of the windings within a predetermined limit and permitting the use of low temperature and relative inexpensive electrical insulating material in connection with the windings.

In carrying out the objects of this invention in one form thereof, I provide a hermetic refrigeration motor-compressor unit, having a casing formed into communicating motor and compressor chambers, with a unidirectional electric motor arranged in the motor chamber. The motor includes a stator having a core carrying windings with end turns extending axially beyond each side of the core and a rotor mounted for rotation relative to the stator. To effect improved dissipation of the heat generated in the windings during operation of the motor-compressor unit, the rotor is formed with a plurality of impeller blades at each end, the outer portion of each blade leading the inlet portion in the direction of rotation of the rotor. In addition, the blades preferably extend axially at least to the axial extremities of the winding end turns. During operation of the motor-compressor unit, the impeller blades direct refrigerant cooling fluid into contact with the winding end turns with a swirling action to transfer heat away from the motor thereby maintaining the winding temperature rise within predescribed limits.

The subject matter which I regard as my invention is particularly pointed out and distinctly claimed in the concluding portion of this specification. My invention, itself, however both as to its organization and method of operation, together with further objects and advantages thereof, may best be understood by reference to the following description taken in connection with the accompanying drawing.

Figure 1:
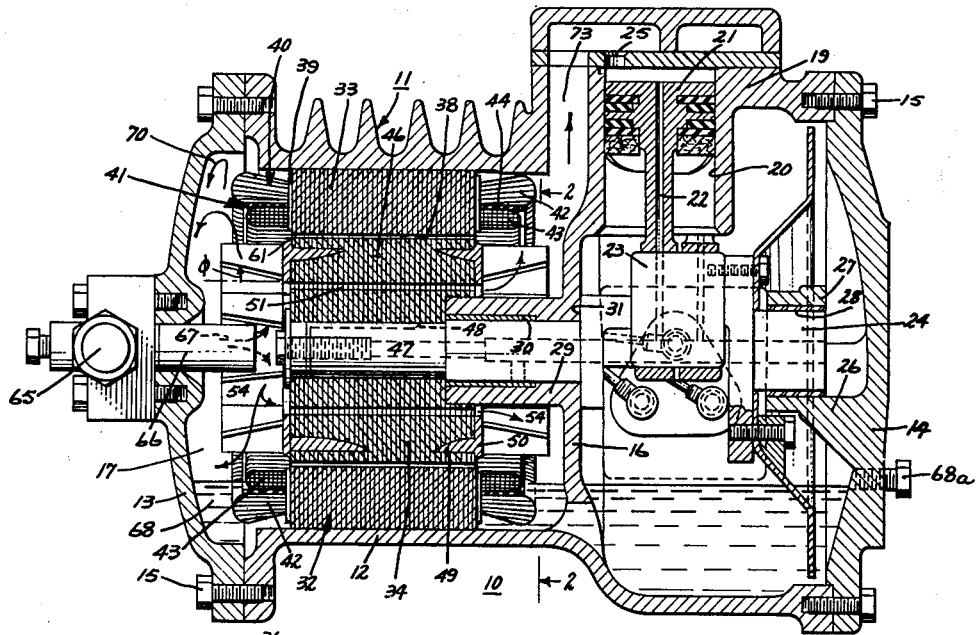
FIG. 1 is a sectional view of a hermetic refrigeration electric motor and compressor unit incorporating the present invention in one form thereof.

Referring now to the drawing in more detail, and specifically to FIG. 1, I have illustrated one form of the invention as being incorporated in a hermetically sealed motor-compressor unit, generally indicated by numeral 10, suitable for use in a refrigerating system. In this exemplification of the invention, unit 10 includes a hermetically sealed cast casing 11 comprising a central generally cylindrical casting 12 closed at each end by enclosure members 13 and 14 which are each secured to casting 12 by a plurality of bolts 15. Casting 12 is integrally provided with a wall 16 intermediate the ends of the casing 11, dividing casing 11 into communicating motor and compressor chambers, 17 and 18 respectively. Compressor chamber 18 is conventionally formed with a cylinder block 19, cast integral with wall 16, and has a cylinder bore 20 in which rides a reciprocating piston 21. Piston rod 22, connected to piston 21, is in turn attached to crank shaft portion 23 of a main drive shaft 24. Compressor chamber 18 is provided with standard inlet and outlet port-valve assemblies (only inlet assembly 25 is shown in FIG. 1), the component parts of the compressor portion of unit 10 being conventional and needing no further description.

In order to rotatably support drive shaft 24, enclosure member 14 is provided with a plurality of spokes 26 terminating in central bearing boss 27 in which is secured a bearing insert or sleeve 28 serving to journal the end of the shaft 24 disposed in the compressor chamber 18. Intermediate wall 16 is also formed with a bearing boss 29 which projects axially into motor chamber 17 and includes bearing sleeve 30 for rotatably supporting the main drive shaft at an intermediate position. The shaft 24 has a shoulder 31 disposed in abutting relation with wall 16, between the wall and crank shaft portion 23, to prevent axial movement of shaft 24 toward the left (as viewed in FIG. 1).

Figure 2:
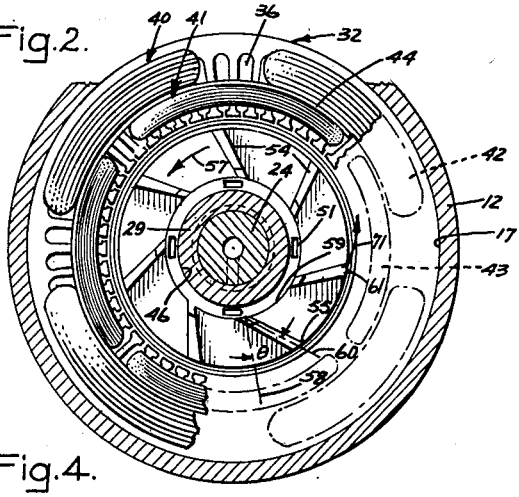
FIG. 2 is a view, partially in section and partially broken away, of the compressor motor of FIG. 1 to illustrate details of the improved rotor assembly of the present invention and its cooling effect with respect to the stator winding.

Referring to FIGS. 1 and 2, for purposes of illustration a unidirectional electric motor 32 of the type commonly employed in hermetic refrigeration motor-compressor units; i.e., alternating current single phase induction split phase, is shown mounted within motor chamber 17 and includes a stator member 33 and rotor member 34. Stator 33 is conventionally formed of a stack of superposed laminations having a cylindrical outer periphery in engagement with and conforming in shape to the internal surface of casting 12. The stator stack has a plurality of teeth 36 (FIG. 2), forming therebetween winding slots 37 and a rotor receiving bore 38 in the usual way. Each slot is provided with a standard liner 39 (FIG. 1) such as described in Patents 2,169,097 and 2,180,983 to Hall for insulating a main running winding 40 and an auxiliary or start winding 41 from the stator stack.

Main running winding 40, wound with a plurality of turns of enameled magnet wire, is arranged in the bottom of certain of the slots 37 to provide four pole operation and has end turns 42 extending axially beyond the respective side faces of the stack. The start winding 41, also formed of enameled magnet wire, is displaced from the main running winding by 90 electrical degrees in the top of slots 37 toward bore 38 and has end turns 43 positioned beneath end turns 42 of the main winding. The windings may be electrically insulated from each other, both within the slots 37 as well as at the winding end turns by phase insulating members 44 disposed between the windings. If desired, these insulating members may be constructed of any suitable low cost relatively inexpensive electrical insulating sheet material, such as a sheet of fibrous material or of polyethylene terephthalate (Mylar). The motor may incorporate any well known switching means (not illustrated) for connecting both windings 40 and 41 to a suitable source of power during starting conditions. Once motor 32 has attained running speed, in accordance with standard practices, any means, such as a current relay (not shown) may be employed to deenergize the start winding 41 and the motor will operate with only the main winding 40 being excited.

In the illustrated embodiment of FIGS. 1 and 2, rotor 34 is of the squirrel-cage induction type and comprises a magnetic laminated core 46, suitably secured to shaft portion 47 which projects inwardly into motor chamber 17 beyond bearing boss 29. It will be seen from FIG. 1 that rotor bore 48 accommodates shaft portion 47 while the end of bore 48, located adjacent wall 16, is counterbored to receive the extreme end of boss 29. Rotor 34 is constructed with a plurality of spaced apart conductors 49 extending axially across core 46, adjacent the outer periphery thereof. These conductors are interconnected with each other at the ends of core 48 by rings 50 to form a squirrel-cage winding, both the conductors 49 and rings 50 being composed of the same non-magnetic electrically conducting material, preferably cast aluminum. Rings 50 extend radially inward toward and in close proximity to the entrances of a plurality of angularly disposed axial cooling ducts 51, which provide passageways for the transfer of refrigerant through the rotor.

To effect an improved transfer of heat away from winding end turns 42 and 43 during starting conditions, and particularly from winding end turn 42 under running speeds, I provide each ring 50 with a plurality of angularly spaced leading angle impeller blades 54 formed integral with rings 50. By "leading angle" is meant the construction in which the outlet portion 55 of the blade in effect leads the inlet portion 56 of the blade in the direction of rotation of rotor 34, as indicated by arrow 57 in FIG. 2. In other words, the angle $\theta$ included between a radial line 58 drawn through inlet portion 56 at the inner circumference 59 of ring 50 and line 60 drawn through outlet blade portion 55 and intersecting line 58 at inner ring circumference 59, is greater than zero in the direction of rotation of rotor 34. In the embodiment of FIGS. 1 and 2, there are seven equally spaced straight blades having an angle $\theta$ of 60°. The optimum number of blades to use will, of course, be dependent upon the particular motor-compressor application. Preferably, blades 54 extend at least to the axial extremities of the main winding end turns 42 and run from the inner circumference 59 of ring 50 to its outer edge 61. In addition, as better seen in FIG. 1, the blades each include an inner draft angle $\phi$ of approximately 8 degrees with respect to axis of rotation of the rotor.

Turning now to the operation of the motor-compressor unit 10, relatively cool suction refrigerant gas, such as Freon 22 for example, is introduced into the motor chamber 17 through an inlet assembly 65 mounted in enclosure member 13. Assembly 65 preferably has a tube 66 projecting axially inward of blades 54 to direct the flow of fluid toward the central part of one end of rotor 34 as indicated by arrows 67. Any entrained oil will be deposited into the lower portion 68 of casing 11 and withdrawn therefrom by outlet means (68a). Under starting conditions, as the motor is coming up to speed and both windings 40 and 41 are energized, the impeller blades 54 will pump cooling refrigerant into contact with winding end turns 42 and 43 of the respective main and start windings.

After running speed has been attained and the start winding has been deenergized, blades 54 are effective to remove heat generated in the main winding 40 even though the winding is disposed radially beyond the unexcited start winding, behind insulator members 44. This is due, in part, to the swirling motion or turbulence imparted to the cooling fluid as it leaves the blades 54, as shown by arrows 70 in FIG. 1 and 71 in FIG. 2. To augment this action, it is preferable that the respective inner surface of enclosure member 13 and of wall 16 be located adjacent the impeller blades 54 and the end turns 42 and 43 to provide a shroud effect for the flow of refrigerant. Fluid will pass through ducts 51, cooling rotor 34, and blades 54 on the side of rotor 34 near wall 16 act to pass the fluid over the winding end turns on that side of the motor, and into channel 73 toward inlet assembly 25 and cylinder block 19 to be compressed by piston 21. It should be noted that due to the large surface area provided by impeller blades 54, the blades also function to dissipate heat from the rotor, augmenting the cooling attributed to cooling ducts 51.

Figure 3:
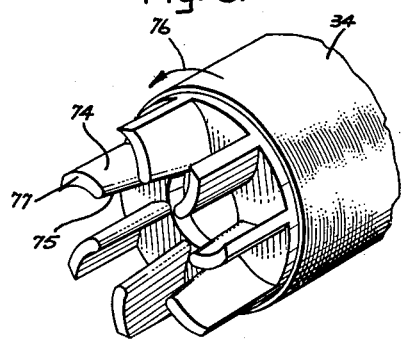
FIG. 3 is a view in perspective of a portion of a second rotor assembly, showing another form of the present invention.

Thus, it should be obvious to those skilled in the art that the present invention is not specifically limited to the embodiment described above, but may be varied without a departure from the true scope and spirit of the invention. For instance, FIG. 3 illustrates a second modification of the leading type impeller blades, which may be formed on each end ring 50 of rotor 34 to produce the superior cooling effect of my invention. For purposes of brevity, only one end of rotor 34 is illustrated in FIG. 3. Impeller blades, denoted by numeral 74 in FIG. 3, are seven in number and are preferably formed of an axial length sufficient to extend to at least the axial extremities of the main winding end turns 42 of motor 32. Like the first embodiment, blades 74 include a draft angle of 8° at inlet portions 75, which is substantially radial with respect to the axis of rotation of the rotor. Beyond inlet portion 75, each blade is curved toward the direction of rotation (arrow 76), terminating in an outlet portion 77 which leads inlet portion 75 in much the same manner as that of the first embodiment.

Figure 4:
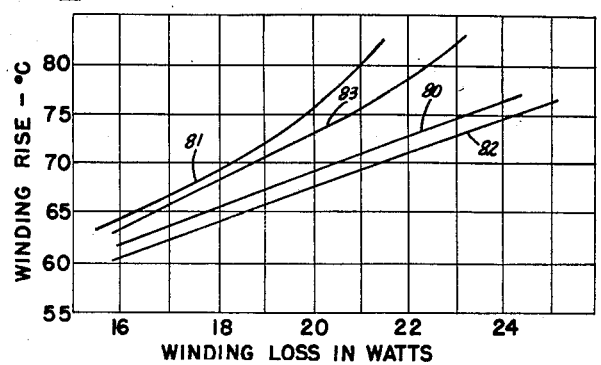
FIG. 4 is a graph comparing the winding temperature rise of compressor motors having a conventional type rotor with the winding rise of a compressor motor employing the rotor of the embodiments of FIGS. 1 and 3 to illustrate the cooling effectiveness of the present invention.

The significance and effectiveness of the present invention may be better understood from an examination of the graph of FIG. 4 which compares the cooling efficiency of my invention, as indicated by the winding temperature rise, with that of conventional arrangements. A two pole 20 frame single phase alternating current resistance split phase motor and simulated compressor unit was constructed in which a stator 33, having a laminated one inch stack and a 2.38 inches diameter rotor receiving bore 38 was mounted within a motor chamber. The stator carried a main winding 40 electrically insulated from and radially beyond a start winding 41 in the manner described for FIGS. 1 and 2, with only the main winding being energized during running conditions. A rotor 34, built basically as illustrated in FIGS. 1 and 2, included a one inch core having a diameter of 2.36 inches. The rotor was provided with blades 54, each having an axial length of 0.795 inch to a point slightly beyond the winding end turns. Blade angle $\theta$ was 60 degrees while draft angle $\phi$ was 8 degrees.

The motor enclosure had an ambient temperature of 26 degrees centigrade. With the voltage and compressor heat input of 31.2 watts, a compressible cooling fluid was introduced into the motor chambers and held constant, the applied load to shaft 24 was varied between 25 and 46 oz. inches torque in order to obtain a number of readings of the main winding losses ($I^2R$ in watts). When tested, that is, the rotor was rotated with the outlet portions 55 of the blades leading the inlet portions in the direction of rotation of the rotor, the motor produced a winding temperature rise curve indicated by numeral 80. The same rotor was then run in a reverse direction, that is, with the blades being in a lagging relationship to the direction of rotor rotation; curve 81 shows the results of this run.

A rotor incorporating seven curved blades 74 as illustrated in the second embodiment of FIG. 3 was substituted for rotor 34 of the first embodiment. Curved blades 74 were dimensionally similar to blades 54 and when the rotor was rotated in the direction of arrow 76, winding rise curve 82 resulted.

The cooling performance of a standard rotor employing radial type impeller blades was also tested in the same rotor enclosure using the same stator under the conditions outlined previously, for the tests conducted with the rotors of FIGS. 1 and 3. The standard rotor, like those of the present invention, had seven blades formed integral with end ring 50. The blades extended across the face of the end ring, but since the blades were radial, angle $\theta$ was, of course, zero degrees. In order to provide a common basis for comparison of the cooling effectiveness of the standard rotor with that of the previously described rotors, the radial blades were modified by increasing their axial dimension to conform in axial size with the blades 54 and 74 mentioned heretofore; i.e., 0.795 inch. The resulting main temperature rise curve is identified in FIG. 4 by numeral 83.

It will be observed from the temperature rise of the main winding 40, that rotor 34 of the preferred embodiments (see curves 80 and 82 respectively) contributed to a marked reduction in the winding temperature rise, as contrasted with that of rotor 34 of FIG. 1 when rotated in the reverse direction to produce a lagging or trailing blade type of rotor (curve 81) and of the conventional radial bladed rotor (curve 83), even in spite of the fact that the radial blades of the latter rotor were lengthened to an axial dimension identical with that of blades 54 and 74. For example, evaluated on a common winding $I^2R$ loss basis of 21 watts, the highest temperature increase permitted by either of the embodiments of my invention was merely 71° C. or a total winding temperature of 97° C. (ambient temperature of 26° C.+the 71° C. rise). On the other hand, with the trailing blade type of structure, the main winding rise was 80° C. (curve 81, a winding temperature of 107° C.) and 76° C. (curve 83, total temperature of 102° C.) with the use of the conventional design, as modified. At higher winding losses, the latter two constructions were even less efficient.

Consequently, since the main winding temperature rise is acutely sensitive to winding $I^2R$ loss and only slightly affected by other motor losses; e.g. friction, FIG. 4 is an accurate presentation of the total cooling efficiency of the respective rotor structures described above. Thus, a hermetic refrigeration motor-compressor unit 10 employing my invention allows the use of low cost winding and phase insulation under conditions where conventional designs would require more expensive, higher temperature insulation material. Exemplifying this are applications which produce a winding loss between 21 and 23 watts. As clearly shown by FIG. 4, and in particular, curves 81 and 83, low-cost fibrous phase insulators which become damaged at approximately 102° or 103° C., would be adversely affected by the elevated winding temperatures in designs employing conventional cooling arrangements. However, in a motor-compressor unit incorporating my invention, the fibrous phase insulators may satisfactorily be included. Another advantage of the present invention is the control it affords, when only the main running winding is energized, to maintain the main winding temperature within predescribed limits even though the end turns of the main winding are physically located radially behind the phase insulator members and the unexcited auxiliary or start winding. In addition, the resistance of the windings will be kept at an acceptable value, enhancing the over-all performance of the motor-compressor unit 10.

While I have shown and described two specific embodiments of the present invention, it is to be understood that modifications may be made by those skilled in the art without actually departing from the invention. I therefore aim in the appended claims to cover all such equivalent variations as come within the true spirit and scope of the invention.

What I claim as new and desire to secure by Letters Patent of the United States is:

1. In a motor-compressor unit having a casing formed with communicating motor and compressor chambers, a unidirectional electric motor arranged in the motor chamber comprising: a stator including a core having winding accommodating means, a rotor receiving bore, and windings carried by said means outwardly of said bore with end turns extending axially beyond each side face of said core; a rotor mounted for relative rotation with said stator, said rotor having an impeller arranged at least at one end thereof, said impeller formed with a plurality of angularly spaced apart blades each having an outlet portion arranged radially beyond an inlet portion, said outlet portions being disposed adjacent said bore in the vicinity of said end turns and leading said inlet portions in the direction of rotation of said rotor whereby under operating conditions of said motor the outlet portions of said blades direct a cooling fluid into contact with said winding end turns to effectively dissipate the heat generated therein in order to maintain the temperature rise of said motor below a predetermined limit.

2. In a motor-compressor unit having a casing formed with communicating motor and compressor chambers, a unidirectional electric motor arranged in the motor chamber comprising: a stator including a core having winding accommodating means, a rotor receiving bore, and windings carried by said means with end turns extending axially beyond each side face of said core; and a rotor mounted for relative rotation with said stator, said rotor including a magnetic core and a squirrel cage winding provided by conductors extending axially through the rotor core and by end rings interconnecting said conductors at each end of the rotor core, at least one of said rings formed with a plurality of angularly spaced apart impeller blades each having an outlet portion arranged radially beyond an inlet portion with said portions joined together by a curved section, said outlet portions being disposed adjacent said bore in the vicinity of said end turns and leading said inlet portions in the direction of rotation of said rotor whereby under operating conditions of said motor said blades impart a swirling action to a cooling fluid and direct said fluid from said outlet portion directly into contact with said winding end turns to effectively dissipate the heat generated therein in order to maintain the temperature rise of said motor below a predetermined limit.

3. In a motor-compressor unit having a casing formed with communicating motor and compressor chambers, a unidirectional electric motor arranged in the motor chamber comprising: a stator including a core having winding accommodating means, a rotor receiving bore, windings having end turns projecting axially beyond each side face of said core; and a rotor mounted for rotation relative to said stator, said rotor including a magnetic core having a plurality of axially extending spaced apart conductors formed of non-magnetic material, an end ring interconnecting said conductors at each end of said rotor core, at least one of said rings integrally formed with impeller blades each having an outlet portion arranged radially beyond an inlet portion, said outlet portions being disposed generally inside said end turns and leading said inlet portions in the direction of rotation of said rotor whereby under operating conditions said blades impart a swirling action to a cooling fluid and direct said fluid from said outlet portion into contact with said winding end turns to effectively dissipate the heat generated therein in order to maintain the winding temperature rise below a predetermined limit.

4. In a hermetic refrigeration motor-compressor unit having a casing formed with communicating motor and compressor chambers, a unidirectional electric motor arranged in the motor chamber comprising: a stator including a core having winding accommodating means, a rotor receiving bore, a main running winding and an auxiliary winding carried by said means, said auxiliary winding disposed radially inward and electrically displaced from said main winding on said core, each winding having end turns projecting axially beyond each side face of said core, and means for electrically insulating said windings one from the other; and a rotor mounted for rotation relative to said stator, said rotor including a magnetic core having a plurality of axially extending spaced apart conductors formed of non-magnetic material, an end ring interconnecting said conductors at each end of said rotor core, at least one of said rings integrally formed with impeller blades each having an outlet portion arranged radially beyond an inlet portion with said outlet portions being disposed adjacent to and in the vicinity of said end turns, said blade portions joined by a section projecting generally in the direction of rotation of said rotor whereby under operating conditions the outlet portions of said blades direct a cooling fluid into contact with said winding end turns to effectively dissipate the heat generated therein in order to maintain the temperature rise of said winding end turns within a predetermined limit.

5. In a hermetic refrigeration motor-compressor unit having a casing formed with communicating motor and compressor chambers, a unidirectional electric motor arranged in the motor chamber comprising: a stator including a core having winding accommodating means, a rotor receiving bore, a main running winding and an auxiliary winding carried by said means, said auxiliary winding disposed radially inward and electrically displaced from said main winding on said core, each winding having end turns projecting axially beyond each side face of said core, and means for electrically insulating said windings one from the other; and a rotor mounted for rotation relative to said stator, said rotor including a magnetic core provided with a shaft receiving bore and a plurality of axially extending spaced apart electrical conductors formed of non-magnetic material disposed adjacent the outer periphery of said core, an end ring interconnecting said conductors at each end of said rotor core, at least one cooling duct extending through said rotor core positioned between said conductors and said shaft receiving bore for directing cooling fluid from one end of said rotor core to the other end thereof, each end ring formed with a number of angularly spaced apart impeller blades having inlet and outlet portions with the outer edge of said outlet portion being disposed radially outwardly from said inlet portion and generally inwardly of said end turns, said blade portions joined together by a section curved in the direction of rotation of said rotor, whereby under operating conditions said blades impart a swirling action to said cooling fluid and direct said fluid from said outlet portions into contact with said main winding to effectively dissipate the heat generated therein in order to maintain the temperature rise of said motor within predetermined limits.

6. In a hermetic refrigeration motor-compressor unit having a casing formed with communicating motor and compressor chambers, a unidirectional electric motor arranged in the motor chamber comprising: a stator including a core having winding accommodating means, a rotor receiving bore, a main running winding and an auxiliary winding carried by said means, said auxiliary winding disposed radially inward and electrically displaced from said main winding on said core, each winding having end turns projecting axially beyond each side face of said core, and means for electrically insulating said windings one from the other; and a rotor mounted for rotation relative to said stator, said rotor including a magnetic core provided with a shaft receiving bore and a plurality of axially extending spaced apart electrical conductors cast of non-magnetic material disposed adjacent the outer periphery of said core, an end ring interconnecting said conductors at each end of said rotor core, at least one cooling duct extending through said rotor core positioned between said conductors and said shaft receiving bore for directing cooling fluid from one end of said rotor core to the other end thereof, a number of angularly spaced impeller blades integrally formed with each end ring and extending axially at least to the extremities of said winding end turns, each of said blades having an outlet portion arranged radially beyond an inlet portion with the outer edge of said outlet portion being disposed adjacent the bore in the vicinity of said end turns and leading said inlet portions in the direction of rotation of said rotor, whereby under operating conditions said blades transfer heat from said rotor, impart a swirling action to said cooling fluid, and direct said fluid from said outlet portions into contact with said main winding to effectively dissipate the heat generated therein in order to maintain the temperature rise of said motor within predetermined limits.

References Cited in the file of this patent

UNITED STATES PATENTS

| | | |
|---|---|---|
| 1,896,749 | Laffoon | Feb. 7, 1933 |
| 2,159,695 | Gorham | May 23, 1939 |
| 2,332,044 | Bell | Oct. 19, 1943 |
| 2,439,933 | Jenkins | Apr. 20, 1948 |
| 2,528,154 | Ludwig | Oct. 31, 1950 |
| 2,615,944 | Carlson | Oct. 28, 1952 |
| 2,991,004 | Denbo | July 4, 1961 |

FOREIGN PATENTS

| | | |
|---|---|---|
| 600,687 | Germany | July 28, 1934 |